(12) United States Patent
Karaagac et al.

(10) Patent No.: US 11,792,104 B2
(45) Date of Patent: Oct. 17, 2023

(54) COLLABORATIVE TESTING OF DEVICES OR SUBSECTIONS WITHIN A NETWORK

(71) Applicant: ABB Schweiz AG, Baden (CH)

(72) Inventors: Abdulkadir Karaagac, Ladenburg (DE); Alexander Gogolev, Dachau (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/961,755

(22) Filed: Oct. 7, 2022

(65) Prior Publication Data

US 2023/0116553 A1  Apr. 13, 2023

(30) Foreign Application Priority Data

Oct. 8, 2021  (EP) ..................................... 21201589

(51) Int. Cl.
*G06F 15/173* (2006.01)
*H04L 43/55* (2022.01)

(52) U.S. Cl.
CPC .................................... *H04L 43/55* (2022.05)

(58) Field of Classification Search
CPC ...................................................... H04L 43/55
See application file for complete search history.

(56) References Cited

U.S. PATENT DOCUMENTS 10,425,321 B2 * 9/2019 Joseph ................ G06F 11/2294
10,892,972 B2 * 1/2021 Ellegaard ............ H04L 43/0852
2015/0326447 A1 * 11/2015 Yoon .................... H04L 41/5025
709/224
2015/0365312 A1 * 12/2015 Pasuparthy ............. H04L 43/10
709/224
2016/0285729 A1 * 9/2016 Chinthalapati ..... H04L 43/0894
(Continued)

FOREIGN PATENT DOCUMENTS

CN         107453884 A  * 12/2017  ......... H04L 41/0843
WO  WO 2018/191447 A1     10/2018
(Continued)

OTHER PUBLICATIONS

European Patent Office, Extended European Search Report in European Patent Application No. 21201589.5, 9 pp. (dated Mar. 21, 2022).

*Primary Examiner* — Richard G Keehn
(74) *Attorney, Agent, or Firm* — Leydig, Voit & Mayer, Ltd.

(57) ABSTRACT

A method for testing a device or a subsection under test within a network includes generating, by at least one sending device that is a regular participant of the network and borders the device or subsection under test, at least one test data flow; sending the test data flow to at least one receiving device that is a regular participant of the network different from the sending device and also borders the device or subsection under test, on a path that passes through the device or subsection under test; determining, by the receiving device, at least one performance metric of the received test data flow; determining, based on the at least one performance metric, whether the device or subsection under test, and/or a link between this device or subsection under test and the sending device or receiving device, is performing according to at least one predetermined criterion.

14 Claims, 2 Drawing Sheets

(56) References Cited

U.S. PATENT DOCUMENTS

2017/0126475 A1\* 5/2017 Mahkonen .......... H04L 43/0864
2020/0162589 A1\* 5/2020 Vijayadharan .......... H04L 41/22
2023/0037124 A1\* 2/2023 Mengwasser ......... H04W 24/10

FOREIGN PATENT DOCUMENTS

WO     WO-2018191447 A1 \* 10/2018 ........... H04L 47/125
WO     WO 2020/143900 A1     7/2020
WO     WO-2020143900 A1 \* 7/2020 ............... H04L 1/08

\* cited by examiner

COLLABORATIVE TESTING OF DEVICES OR SUBSECTIONS WITHIN A NETWORK

CROSS-REFERENCE TO RELATED APPLICATIONS

This patent application claims priority to European Patent Application No. 21201589.5, filed on Oct. 8, 2021, which is incorporated herein in its entirety by reference.

FIELD OF THE DISCLOSURE

The present disclosure relates to the testing of devices or subsections in communication networks, such as time-sensitive networks (TSN) for use by distributed control systems (DCS).

BACKGROUND OF THE INVENTION

The monitoring and active controlling of an industrial plant is based on various information gathered within the plant. For example, sensor devices output measurement values, and actuator devices report their operational status. The information may be used by a distributed control system, DCS. For example, sensor data may be used as feedback in control loops that control the plant such that certain state variables, such as a temperature or a pressure, are kept at desired set-point values.

Such communication is time-critical. It needs to be guaranteed that any change in measurement values is communicated in a timely manner, such that the DCS can react to the change. Also, any actions taken by the DCS need to be communicated to actuators in the plant in a timely manner. Time-sensitive networks, TSN, nominally guarantee end-to-end-determinism in the communication. However, the network may deviate from this nominal state for a variety of reasons, including configuration errors, hardware or cabling faults, or hardware and/or software components that promise a certain performance but just fail to deliver on this promise.

WO 2020/143 900 A1 discloses a method for handling failure of a TSN communication link in a TSN network.

BRIEF SUMMARY OF THE INVENTION

In one general aspect, the present disclosure describes a method for facilitating the testing of devices or subsections within a network, so as to allow locating and remedying the source of network problems.

More specifically, the disclosure describes a method for testing a device or a subsection under test within a network. In particular, a subsection may comprise a plurality of devices that are interconnected by links. This subsection may form a contiguous domain within the network that is connected to the rest of the network via certain links. Devices may include, for example, end devices such as computers, sensors, actuators or controllers in a distributed control system, as well as network infrastructure devices such as switches, routers, bridges or wireless access points.

In the course of the method, at least one test data flow is generated by at least one sending device. This sending device is a regular participant of the network and borders the device or subsection under test. That is, the sending device is present in the network as per the normal deployment of the network for its intended operation. It is not specifically inserted into the network for the purpose of testing and/or troubleshooting. The sending device is connected to the device or subsection under test via a link of the network, which is preferably a direct link that does not pass via intermediate devices.

The sending device sends the test data flow to at least one receiving device that is different from the sending device. Just like the sending device, the receiving device is a regular participant of the network and also borders the device or subsection under test. The test data flow is sent on a path that passes through the device or subsection under test. The receiving device determines at least one performance metric of the received test data flow. If network communication to, from or within the device or subsection under test is suffering from a problem, this can be expected to be visible in the at least one performance metric. Examples of performance metrics include throughput, latency, reliability and jitter. These belong to the quantities for which guarantees are given in the context of TSN networks.

Based on the at least one performance metric, it is then determined whether the device or subsection under test, and/or a link between this device or subsection under test and the sending device or receiving device, is performing according to at least one predetermined criterion. For example, if the one or more performance indicators are all nominal, this indicates that everything in the path between the sending device and the receiving device is working properly. But if one or more performance indicators fall short of nominal values, this indicates that there is a problem somewhere in said path between the sending device and the receiving device.

BRIEF DESCRIPTION OF THE SEVERAL VIEWS OF THE DRAWING(S)

DETAILED DESCRIPTION OF THE INVENTION

Figure 1:
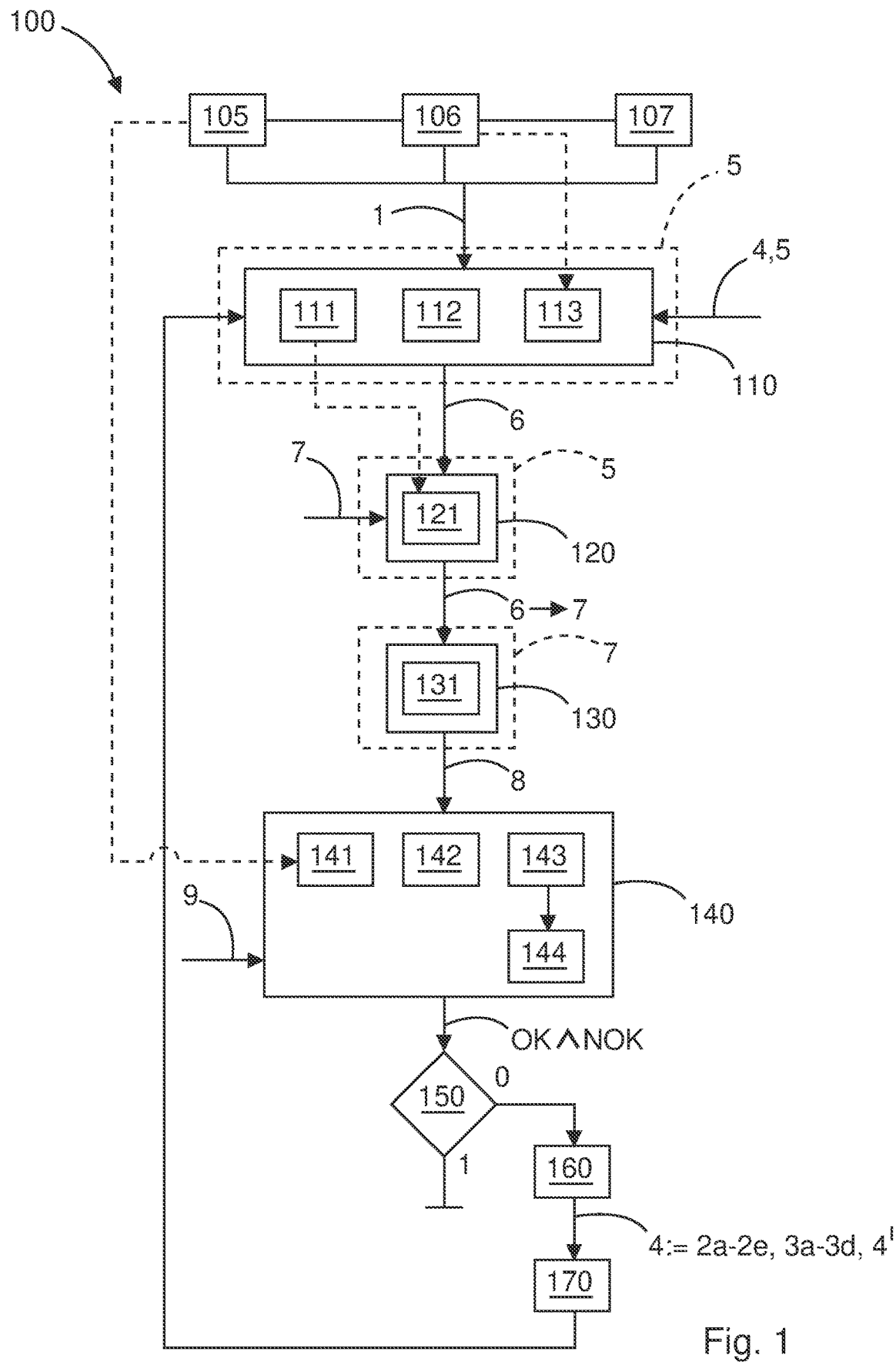
FIG. 1 is a flowchart for a method in accordance with the disclosure, which is applied for testing a device or a subsection under test within a network.

FIG. 1 is a schematic flow chart of an exemplary embodiment of the method 100 for testing a device or a subsection under test 4 within a network 1. As it is detailed further in FIG. 2, the network 1 comprises TSN bridges 2a-2e, as well as TSN end stations 3a-3d.

In step 105, the network 1 may be chosen to be deterministic with respect to resource allocation and/or traffic scheduling.

In step 106, the network 1 may be to be a network 1 that is configured to carry network traffic of a distributed control system, DCS, in an industrial plant.

In step 107, the network 1 may be chosen to be in a deployment state intended for regular operation.

In step 110, at least one sending device 5 generates at least one test data flow 6. This sending device 5 is a regular participant of the network 1 and borders the device or subsection under test 4.

In step 120, the sending device sends the test data flow 6 to at least one receiving device 7 on a path that passes through the device or subsection under test 4. The receiving device 7 is another regular participant of the network 1 different from the sending device 5. It also borders the device or subsection under test 4.

In step 130, the receiving device 7 determines at least one performance metric 8 of the received test data flow 6.

In step 140, based on the at least one performance metric 8, it is determined whether the device or subsection under test 4, and/or a link between this device or subsection under test 4 and the sending device 5 or receiving device 6, is performing according to at least one predetermined criterion 9. This determination may, for example, comprise a numeric score or be a binary determination. If the determination is a binary one, the result may be either OK or "not OK" (NOK).

In step 150, it is checked whether the determination is OK. If this is not the case (truth value 0), in step 160, at least one device 2a-2e, 3a-3d belonging to the subsection under test 4, and/or a subset 4' of the subsection under test 4, is determined as a new device or subsection under test 4. In step 170, the method 100 is then repeated for this new device or subsection under test 4, so as to narrow down the root cause of the bad performance in the original subsection under test 4.

According to block 111, multiple sending devices 5 may be chosen, and according to block 121, multiple receiving devices 7 that border the device or subsection under test 4 are chosen. The choices are made such that every TSN bridge 2a-2e and every TSN end station 3a-3d that is a regular participant of the network 1 and borders the device or subsection under test 4 assumes the role of the sending device 5, and/or the receiving device 7, with respect to at least one test data flow 6.

According to block 112, at least one test data flow may be determined based at least in part on one or more of:
- a traffic pattern expected during regular operation of the network 1;
- a configuration of the network 1; and
- traffic scheduling of the network 1.

According to block 113, if the network carries control traffic in an industrial plant, the test data flow 6 may be generated (and/or sent)
- before startup of the industrial plant; and/or
- during maintenance of the industrial plant; and/or
- while equipment of the industrial plant that is controlled by the device and/or subsection under test (4) is not in use and/or deactivated.

According to block 131, the at least one performance metric 8 may comprise one or more of: throughput, latency, reliability and jitter.

According to block 141, if the network 1 is deterministic with respect to resource allocation and/or traffic scheduling, the at least one performance metric 8, and/or the at least one predetermined criterion 9, may be determined based at least in part on the resource allocation and/or traffic scheduling of the network 1.

According to block 142, the at least one performance metric 8, and/or the at least one predetermined criterion 9, may be determined based at least in part on a nominal performance specification of the device or subsection under test 4, and/or of a link between this device or subsection under test 4 and a sending device 5 or receiving device 7.

According to block 143, performance metrics 8 may be aggregated from multiple receiving devices 7. According to block 144, it may then be determined based on the aggregated performance metrics 8 whether the device, substation under test or link 4 is performing according to the at least one predetermined criterion 9.

Figure 2:
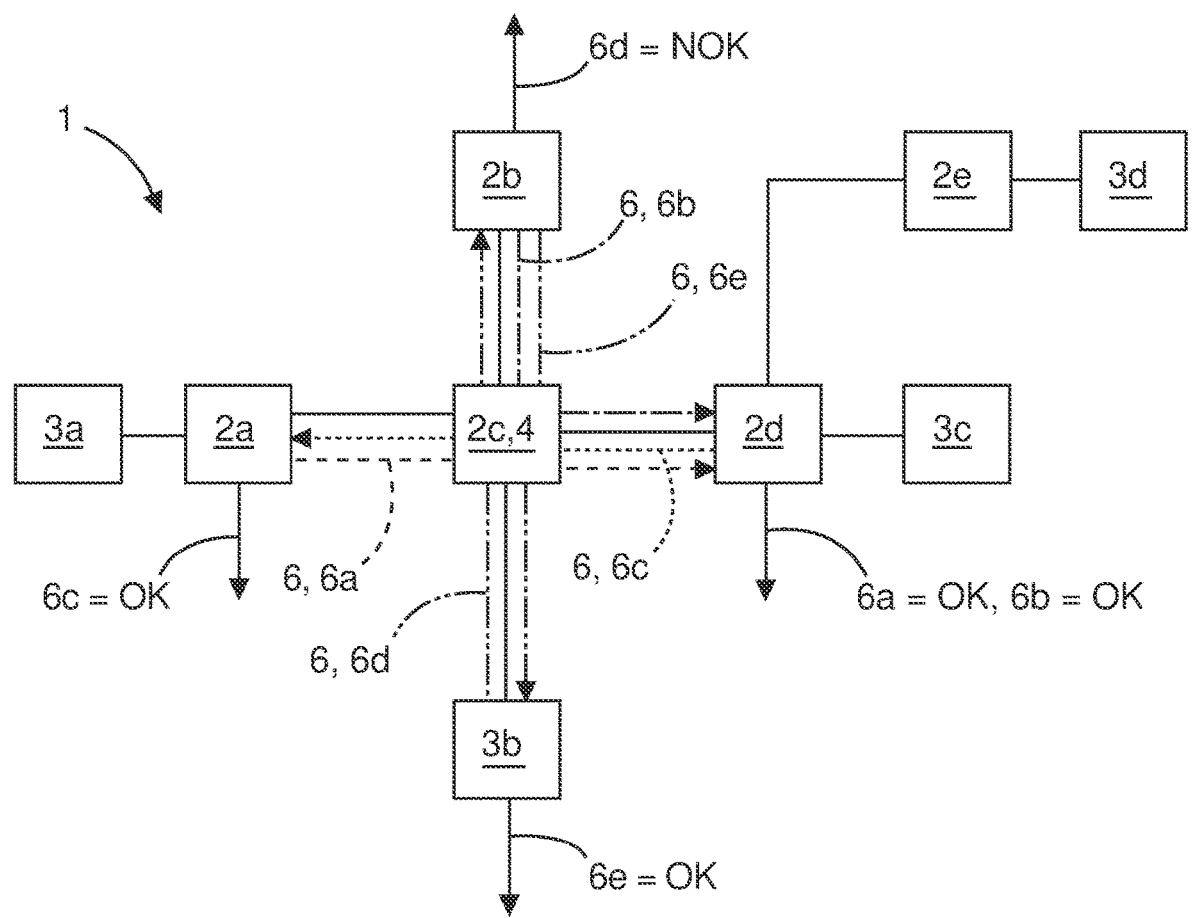
FIG. 2 is a block diagram of an exemplary application of the method of FIG. 1, applied to a device under test in a TSN network.

FIG. 2 shows an exemplary TSN network 1 that comprises five TSN bridges 2a-2c and four TSN end stations 3a-3d. In the example shown in FIG. 2, the TSN bridge 2c is the device under test 4. The TSN bridges 2a, 2b and 2d, as well as the TSN end station 3b, border the device under test 4. That is, they are neighbors of the device under test 4 that are connected to this device under test 4 by direct links. The neighboring devices 2a, 2b, 2d and 3b take turns in acting as sending devices 5 and receiving devices 7 to convey five different test data flows 6, 6a-6e on paths that lead through the device under test 4.

The first test data flow 6a is sent by TSN bridge 2a that acts as the sending device 5 to the TSN bridge 2d that acts as the receiving device 7. The second test data flow 6b is sent by TSN bridge 2b that acts as the sending device 5 to the same TSN bridge 2d as receiving device 7. The TSN bridge 2d, in its role as receiving device 7, determines that both test data flows 6a and 6b have been received with an acceptable performance (OK).

Compared with the first test data flow 6a, the third test data flow swaps the roles of the TSN bridges 2a and 2d. That is, TSN bridge 2d now acts as the sending device 5, and TSN bridge 2a now acts as the receiving device 7. Therefore, TSN bridge 2a determines that test data flow 6c has been received with an acceptable performance (OK).

The fourth test data flow 6d is sent from TSN end station 3b as sending device 5 to TSN bridge 2b as receiving device 7. TSN bridge 2b determines that this test data flow 6d has not been received with an acceptable performance (NOK).

By contrast, if the roles are again swapped for the fifth test data flow 6e (TSN bridge 2b is sending device 5, and TSN end station 3b is receiving device 7), the TSN end station 3b determines that this fifth test data flow 6e has been received with an acceptable performance.

The end result of the test is that there is a problem with the device under test 4, but that it only affects one direction of communication between TSN end station 3b and TSN bridge 2b. A possible root cause for this problem is a configuration error on TSN bridge 2c as device under test 4 that causes this TSN bridge 2c to deny the TSN end station 3b the sending of data flows into the network 1, such as a missing entry in the schedule or a wrong or missing entry in an access control whitelist.

In a method in accordance with the disclosure, devices or subsections may be tested using only hardware and links that are already in the network as part of its normal deployment for its intended use. No particular hardware needs to be inserted into the network, which can fully remain in a deployment state intended for regular operation. In particular, it is possible to test the network in exactly the same hardware, software and installation configuration and in exactly the same physical environment in which regular operation of the network is intended. In this manner, many more kinds of problems may be detected. Once these problems have been fixed, the probability that further problems will surprisingly occur during regular operation of the network is greatly reduced.

For example, if a transceiver module is bad and the physical layer just barely manages to output a required voltage level for a logical bit "1" onto the physical link, it depends on the exact physical configuration of the link and on the device on the other end of the link whether the logical bit "1" will be correctly detected or whether it will be mis-detected as a logical bit "0". Thus, a special testing and/or troubleshooting device with a high quality transceiver might still receive all bits sent by the bad transceiver module correctly. But a transceiver in a device that is part of the real deployment may be of a lesser quality and/or already degraded due to wear and tear, so it may experience bit errors. So while the testing and/or troubleshooting device does not see any problem, a problem may occur later during regular operation. Using regular participants of the network as the sending device and the receiving device helps to catch such problems in time.

In another example, if there is a loose contact or a bad cable that causes sporadic errors, inserting a test and/or troubleshooting device requires physically manipulating cables, which might cause the problem to temporarily disappear during the testing. The problem might thus go unnoticed and reappear later during regular operation of the network. Using regular participants of the network as the sending device and the receiving device literally avoids physically touching any device or cable of the network.

Also, problems may be created during installation of otherwise performing equipment. For example, a wrong type of cable (e.g., Ethernet Cat-5 instead of Cat-6e) may be chosen, or a required grounding of a cable may be omitted. Bridges may be misconfigured, and/or cables may be plugged into wrong ports. All these installation issues may be detected by means of the testing in exactly the deployment state that is to be used for regular operation.

Moreover, the software configuration of the network will be the same that will be used for regular operation, so that problems due to a certain software configuration may be detected as well. For example, mutual communication between devices may be impeded if they are operating with different software versions.

The possibility to detect a broad class of problems is particularly important in the main use chase where the network is configured to carry network traffic of a distributed control system, DCS, in an industrial plant. If any unexpected problems occur during regular operation of the network, they may immediately impact the operation of the plant before there is time to remedy them. The network problem may thus have a direct impact on the productivity, or even on the safety or integrity, of the plant.

Also, in industrial plants, there are more specific causes for errors that can only be spotted if the testing is performed in the actual deployment state for regular operation. For example, industrial equipment may send electromagnetic cross-talk onto cables, so that transmissions that are already of marginal physical quality may be garbled. In another example, the proximity of a network device to heat-generating industrial equipment may cause the temperature inside the network device to rise too high, so that the processor of this network device steps down to a slower clock speed and performance of the network device drops.

In particular, the test data flow may be created and then sent before startup of the industrial plant, and/or during maintenance of the industrial plant. In this manner, if any problems become apparent during testing, they will not affect the regular operation of the plant. But the test data flow may also be created and then sent while equipment of the industrial plant that is controlled by the device and/or subsection under test is not in use and/or deactivated. In this manner, more opportunities for performing tests can be created, allowing to periodically re-test in order to spot any newly occurring problems (such as the degradation of electronic components).

In a particularly advantageous embodiment, multiple sending devices and multiple receiving devices that border the device or subsection under test are chosen such that every device that is a regular participant of the network and borders the device or subsection under test assumes the role of the sending device, and/or the receiving device, with respect to at least one test data flow. In this manner, multiple paths through the device or subsection under test may be investigated, so that all components in the device or subsection under test that might potentially cause a problem are in at least one investigated path. If performance metrics on all investigated paths are nominal, the probability of an unexpected problem occurring during regular operation of the network is very low. Figuratively speaking, investigation of one path from a sending device to a receiving device corresponds to an X-ray image of the device or subsection under test from one perspective, and images taken from multiple perspectives are needed for a complete assessment of the state of the device or subsection under test. All this can be performed automatically without any manual intervention, through an organized effort of neighbors of the device or subsection under test in a distributed and collaborative manner.

Therefore, in a further particularly advantageous embodiment, performance metrics from multiple receiving devices are aggregated. This aggregating may be performed on one more receiving devices, and/or on a centralized Network Management or Monitoring Application entity. Based on the aggregated performance metrics, it is then determined whether the device, substation under test or link is performing according to the at least one predetermined criterion.

In a particularly advantageous embodiment, the network is chosen to be deterministic with respect to resource allocation and/or traffic scheduling. For example, the network may be a TSN network. At least one performance metric, and/or the at least one predetermined criterion, may then be determined based at least in part on the resource allocation and/or traffic scheduling of the network. For example, in a deployment state ready for the intended use of the network, throughput rates and/or delivery times may be configured for different types of network traffic. For simulated traffic of each type used as a test data flow, the performance metrics may then be reasonably expected to correspond to what has been allocated to this particular type. Information about the resource allocation and/or traffic scheduling may, for example, be obtained from the Centralized Network Configuration, CNC, entity, and/or from the Centralized User Configuration, CUC, entity of a TSN network.

In a further advantageous embodiment, the at least one performance metric, and/or the at least one predetermined criterion, is determined based at least in part on a nominal performance specification of the device or subsection under test, and/or of a link between this device or subsection under test and a sending device or receiving device. This allows to detect under-performing devices or links. For example, as discussed above, a device may be prevented from outputting its full performance because its internal temperature is too high and its processor needs to step down clock speed. But it is also possible that a manufacturer of a device deliberately cheats and labels the device with a higher performance than it can actually output, in the hope that the customer will not attempt to fully utilize the advertised performance and thus will not notice he has been cheated.

In a further particularly advantageous embodiment, at least one test data flow is determined based at least in part on one or more of:
  a traffic pattern expected during regular operation of the network;
  a configuration of the network; and
  traffic scheduling of the network.

Specifically, mimicking the traffic pattern expected during regular operation of the network causes the scenario that is being tested to more realistically correspond to the intended regular operation. In particular, some problems might only occur during certain phases of high load. For example, a high traffic volume might cause buffers, queues, address tables or other system resources of network infrastructure devices to become exhausted.

Also, the configuration and/or traffic scheduling of the network may already give away to a large extent how much traffic of which kind is to be expected where in the device or subsection under test. Using this information for generating test data flow keeps the test as close as possible to the scenario intended for regular operation.

Devices or subsections in the network may be tested one by one, so that the testing progressively covers more and more of the network until all relevant entities have been tested. But the method may also be used to progressively narrow down the scope of the testing until a culprit for a problem can be found.

Therefore, in a further advantageous embodiment, in response to determining that a subsection under test is not performing according to the at least one predetermined criterion, at least one device belonging to the subsection under test, and/or a subset of this subsection under test, is determined as a new device or subsection under test. The method is then repeated for this new device or subsection under test. In this manner, the root cause of the bad performance in the original subsection under test may be narrowed down.

The method may be wholly or partially computer-implemented. The invention therefore also relates to one or more computer programs with machine-readable instructions that, when executed on one or more computers and/or compute instances, cause the one or more computers to perform the method. In this context, a virtualization platform, a hardware controller, network infrastructure devices (such as switches, bridges, routers or wireless access points), as well as end devices in the network (such as sensors, actuators or other industrial field devices) that are able to execute machine readable instructions are to be regarded as computers as well. In particular, a network may be embodied as a software-defined network running on universal hardware.

The invention therefore also relates to a non-transitory storage medium, and/or to a download product, with the one or more computer programs. A download product is a product that may be sold in an online shop for immediate fulfillment by download. The invention also provides one or more computers and/or compute instances with the one or more computer programs, and/or with the one or more non-transitory machine-readable storage media and/or download products.

LIST OF REFERENCE SIGNS 1 network
2a-2e TSN bridges as devices in network 1
3a-3d TSN end stations as devices in network 1
4 device or subsection under test
4' subset of device or subsection under test 4
5 sending device
6, 6a-6e test data flow
7 receiving device
8 performance metric
9 predetermined criterion for performance metric
100 method for testing device or subsection under test 4
110 generating test data flow 6
111 choosing multiple sending devices 5 for collaboration
112 creating test data flow 6 based on specific information
113 generating data flow 6 at particular points in time
120 sending test data flow 6 to receiving device 7
121 choosing multiple receiving devices 7 for collaboration
130 determining performance metric 8
131 examples for performance metrics
140 checking performance metric 8 with predetermined criterion 9
141 determining criterion 9 based on particular information
142 using nominal performance specification of device 4
143 aggregating performance metrics 8
144 checking aggregated metrics 8 with predetermined criterion 9
150 determining whether performance is acceptable
160 determining new device or subsection under test 4
170 repeating test for new device or subsection under test 4

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for testing a device or a subsection under test within a network, the method comprising:
generating, by a sending device that is a regular participant of the network and borders the device or subsection under test, at least one test data flow;
sending, by the sending device, the test data flow to at least one receiving device that is a regular participant of the network different from the sending device and also borders the device or subsection under test, on a path that passes through the device or subsection under test;

determining, by the receiving device, at least one performance metric of the received test data flow; and determining, based on the at least one performance metric, whether the device or subsection under test is performing according to at least one predetermined criterion, wherein multiple sending devices and multiple receiving devices that border the device or subsection under test are chosen such that every device that is a regular participant of the network and borders the device or subsection under test becomes the sending device or the receiving device with respect to at least one test data flow.

2. The method of claim 1, further comprising a link between the device or subsection under test and the sending device or receiving device, wherein the determining whether the device or subsection under test is performing according to the at least one predetermined criterion further includes whether the link between the device or subsection under test and the sending device or receiving device is also performing according to the at least one predetermined criterion.

3. The method of claim 2, wherein the at least one performance metric, and/or the at least one predetermined criterion, is/are determined based at least in part on a nominal performance specification of the device or subsection under test, and/or of a link between this device or subsection under test and a sending device or receiving device.

4. The method of claim 1, wherein the network is chosen to be deterministic with respect to resource allocation and/or traffic scheduling.

5. The method of claim 4, wherein the at least one performance metric, and/or the at least one predetermined criterion, is/are determined based at least in part on the resource allocation and/or traffic scheduling of the network.

6. The method of claim 1, wherein at least one test data flow is determined based at least in part on one or more of:
    a traffic pattern expected during regular operation of the network;
    a configuration of the network; and
    traffic scheduling of the network.

7. The method of claim 1, wherein the network is chosen to be a network that is configured to carry network traffic of a distributed control system, DCS, in an industrial plant.

8. The method of claim 7, wherein the test data flow is generated and/or sent during at least one of:
    before startup of the industrial plant;
    during maintenance of the industrial plant; and
    while equipment of the industrial plant that is controlled by the device and/or subsection under test is not in use or is deactivated.

9. The method of claim 1, wherein the network is chosen to be in a deployment state intended for regular operation.

10. The method of claim 1, wherein the at least one performance metric comprises one or more of: throughput, latency, reliability and jitter.

11. The method of claim 1, further comprising:
    aggregating performance metrics from the multiple receiving devices; and
    determining whether the device or substation under test is performing according to the at least one predetermined criterion based on the aggregated performance metrics.

12. The method of claim 11, wherein the network further comprises a link between the device or subsection under test and the sending device or receiving device, and wherein the method further comprises determining whether the link is performing according to the at least one predetermined criterion based on the aggregated performance metrics.

13. The method of claim 1, further comprising:
    composing a response when it is determined that that the subsection under test is not performing according to the at least one predetermined criterion;
    determining at least one device belonging to the subsection under test, and/or a subset of the subsection under test, as a new device or subsection under test; and
    repeating the method for the new device or subsection under test, so as to narrow down a root cause of the bad performance in the original subsection under test.

14. The method of claim 1, wherein every individual device that is a regular participant of the network and borders the device or subsection under test is paired with a corresponding individual device to form a plurality of sending-receiving pairs with respect to a plurality of test data flows, and
    wherein a first sending-receiving pair of the plurality of sending-receiving pairs is defined with respect to a first test data flow, a second sending-receiving pair of the plurality of sending-receiving pairs is defined with respect to a second test data flow.

* * * * *